(12) United States Patent
Ng et al.

(10) Patent No.: US 6,903,469 B2
(45) Date of Patent: Jun. 7, 2005

(54) STEPPING MOTOR

(75) Inventors: Tai Wo Ng, Laguna (HK); Roberto Zafferri, Lantau Island (HK)

(73) Assignee: Wellgain Optical Communications Limited (HK)

( * ) Notice: Subject to any disclaimer, the term of this patent is extended or adjusted under 35 U.S.C. 154(b) by 0 days.

(21) Appl. No.: 10/719,292

(22) Filed: Nov. 20, 2003

(65) Prior Publication Data

US 2004/0104627 A1 Jun. 3, 2004

(30) Foreign Application Priority Data

Dec. 2, 2002 (CN) .......................................... 02289107 U

(51) Int. Cl.$^7$ .......................... H02K 37/14; H02K 37/00
(52) U.S. Cl. .............................. 310/49 R; 310/40 MM; 310/192
(58) Field of Search ........................ 310/40 MM, 162, 310/163, 165, 49 R, 190, 192–193, 254, 257

(56) References Cited

U.S. PATENT DOCUMENTS

| 4,371,821 A | | 2/1983 | Laesser et al. ............ 310/49 R |
| 5,130,594 A | * | 7/1992 | Taghezout et al. .......... 310/256 |
| 5,909,070 A | * | 6/1999 | Taghezout ................ 310/49 R |

* cited by examiner

Primary Examiner—Burton Mullins
(74) Attorney, Agent, or Firm—Blakely Sokoloff Taylor & Zafman LLP

(57) ABSTRACT

A stepping motor includes a stator and a permanent-magnet rotor having a rotor axis. The stator is a stator blade made of soft magnetic materials whose center position is a rotor hole accommodating the rotor. Coils are provided on two sides of the stator blade. Within the stator blade are located three narrow grooves, each of which is disposed at an angle of 120° to one another along a radial direction of the rotor. Two ends of the narrow grooves are connected with the stator blade, and when a current is present in the coils a magnetic-pole end surface surrounding the rotor hole is formed by the part of the motor between two of the narrow grooves. The stator blade of the stepping motor is solid, resistant to twist and easily machined and assembled.

2 Claims, 3 Drawing Sheets

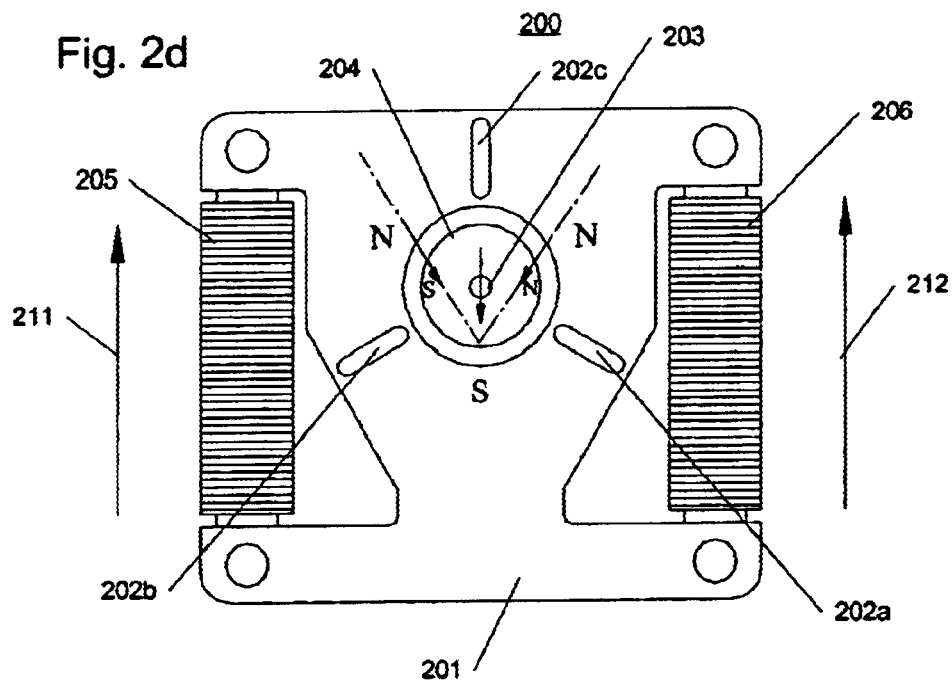
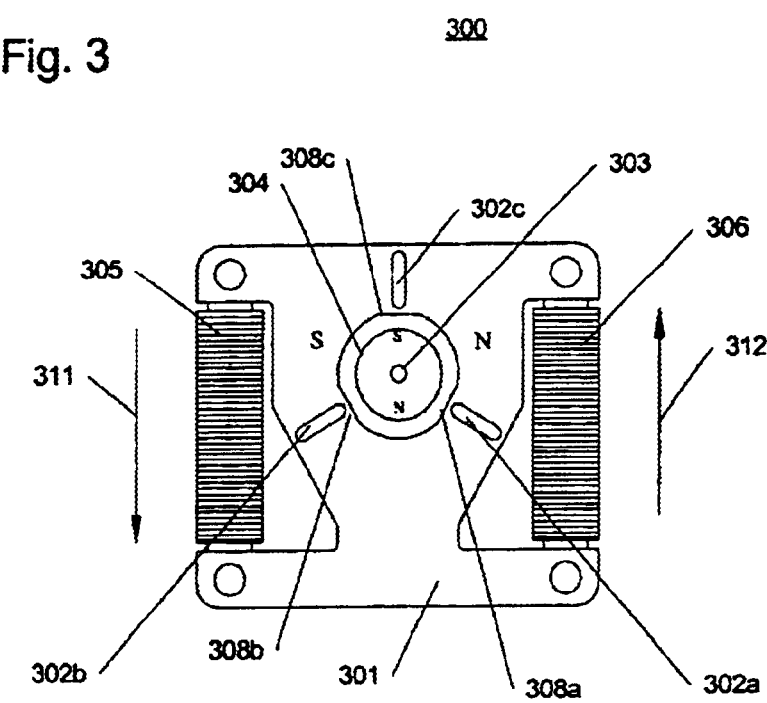

STEPPING MOTOR

RELATED APPLICATION

This application is related to and hereby claims the priority benefit under 35 U.S.C. 119 of Chinese Utility Model Application No. 02289107.2, entitled "Stepping Motor", filed Dec. 2, 2002.

FIELD OF THE INVENTION

The present invention relates to a stepping motor, and more particularly to the structure of a stepping motor.

BACKGROUND

In electronic products such as automobiles, meters and watches, a precise and micro-stepping motor is necessary. FIG. 1 illustrates a structural scheme of a stepping motor 100 as published in U.S. Pat. No. 4,371,821. The stator 101 of this stepping motor 100 is a stator blade made of soft magnetic materials and has the profile of an isosceles trapezoid, whose center position is a rotor hole accommodating the rotor. The center position of the bottom edge of stator 100 has a gap 102a. In addition there are two gaps 102b and 102c surrounding the rotor hole, such that the gaps 102a, 102b and 102c are separated from each other by an angle of 120°, thus forming three magnetic-pole end surfaces 101a, 101b and 101c surrounding the rotor hole. Coils 105 and 106 are equipped on both sides of the stator blade 101.

The rotor of stepping motor 100 is composed of the permanent-magnet rotor 104 and rotor axis 103. Both ends of the rotor axis 103 have gears (not shown) to transfer revolving motion of the rotor.

When a current is applied to coils 105 and 106 in a certain direction (i.e., so as to create magnetic fields in directions 111 and 112, respectively), a magnetic field will be formed between the magnetic-pole end surfaces of the stator blade 101. This magnetic field will be saturated at the gaps 102a, 102b and 102c. As a result, a magnetic field moment will be produced to push the rotor 104 to revolve about axis 103.

The directions of the current in the two coils 105 and 106 can be changed under control of the control circuit (not shown), which can make the motor revolve in steps in single direction. The distances from the three magnetic-pole end surfaces 101a, 101b and 101c to the rotor 104 are variable, and therefore the shape thereof makes the rotor 104 reach a balancing status on the centrosymmetric axis on the bottom side of the isosceles trapezoid. Thus the stepping motor 100 can realize 180° stepped rotation.

This stepping motor 100 has advantages such as stable rotation and high precision. But because its stator blade 101 is very thin, the gaps 102a, 102b and 102c make the stator blade very weak and easy to twist, resulting in increasing difficulties of machining and assembling.

SUMMARY OF THE INVENTION

In one embodiment, the present stepping motor includes a stator blade made of soft magnetic materials and a permanent magnet rotor having a rotor axis. The rotor is accommodated within a rotor hole located at a center position of the stator blade. The stator blade incorporates three narrow grooves therein, each of which is disposed at an angle 120° to one another along a radial direction of the rotor. Two ends of the narrow grooves are connected with the stator blade such that when a current is present in coils disposed along two sides of the stator blade a magnetic-pole end surface surrounding the rotor hole is formed by a part of the stepping motor between two of the narrow grooves in the stator blade. In some embodiments the rotor hole has a circular vertical cross-section concentric with the rotor and the distance from each end of each of the narrow grooves to a center of the rotor axis is equal. In other embodiments, the rotor hole has a vertical cross-section approximating a circle but for straight-line sections, each of which is perpendicular to a diameter of the rotor, disposed about the rotor hole in positions proximate front-end locations of the narrow grooves in the stator blade.

BRIEF DESCRIPTION OF THE DRAWINGS

The present invention is illustrated by way of example, and not limitation, in the figures of the accompanying drawings in which:

FIGS. 2a–2d illustrate principle schemes of stepped rotation of a stepping motor configured according to one embodiment of the present invention; and FIG. 3 illustrates a structural scheme of a stepping motor configured according to another embodiment of the present invention.

DETAILED DESCRIPTION

Described herein is a stepping motor configured to solve problems, such as those stated above, existing with current implementations of such motors such as having stator blades that are easily damaged and difficult to machine and assemble. In contrast, the present stepping motor is not easily damaged and yet is relatively easy to machine and assemble.

In one embodiment, the present stepping motor includes a stator, a rotor and control circuit. The stator is a stator blade made of soft magnetic materials whose center position is a rotor hole accommodating the rotor, and coils are provided respectively on both sides of the stator blade. The rotor is composed of a permanent-magnet rotor and rotor axis, and on both ends of the rotor axis there are gears, which transfer revolving movement of the rotor. The stator blade includes three narrow grooves separated from each other by an angle of 120° along the radial direction of the rotor. Two ends of the narrow grooves are connected with the stator blade, and a magnetic-pole end surface surrounding the rotor hole is formed by the part between two narrow grooves in the stator blade.

In further embodiments, the present stepping motor may be such that the shape of a vertical section of the rotor hole is a concentric circle conforming to that of the rotor, and the distance from the end of each narrow groove to the center of the rotor axis is the same. In some cases, the vertical section of the rotor hole is, at the front-end position of the narrow grooves, a straight-line section that is perpendicular to the diameter of the rotor.

When current is applied respectively to both coils in a certain direction, a magnetic field will be formed between the magnetic-pole end surfaces of the stator blade. Because two ends of the narrow groove are connected weakly with the stator blade, the magnetic field is saturated at these weak connections, and, as a result, a magnetic field moment will be produced to push the rotor to revolve. Because the distances from the points on the magnetic-pole end surfaces of the stator blade to the axial center of the rotor are the same, and the rotor reaches balancing status at the end points of the narrow grooves, changing the current directions of two coils, in order, can make the motor realize 120° stepped rotation.

For the present stepping motor, because the narrow grooves are machined on the stator blade (instead of the gaps as in conventional stepping motors), and two ends of the narrow grooves are connected with the stator blade, the stator blade is an integral that is solid, resistant to twist and easy to be machined and assembled. In addition, because the rotor reaches balancing status at the end points of the narrow grooves, the present stepping motor can realize 120° stepped rotation.

Figure 1:
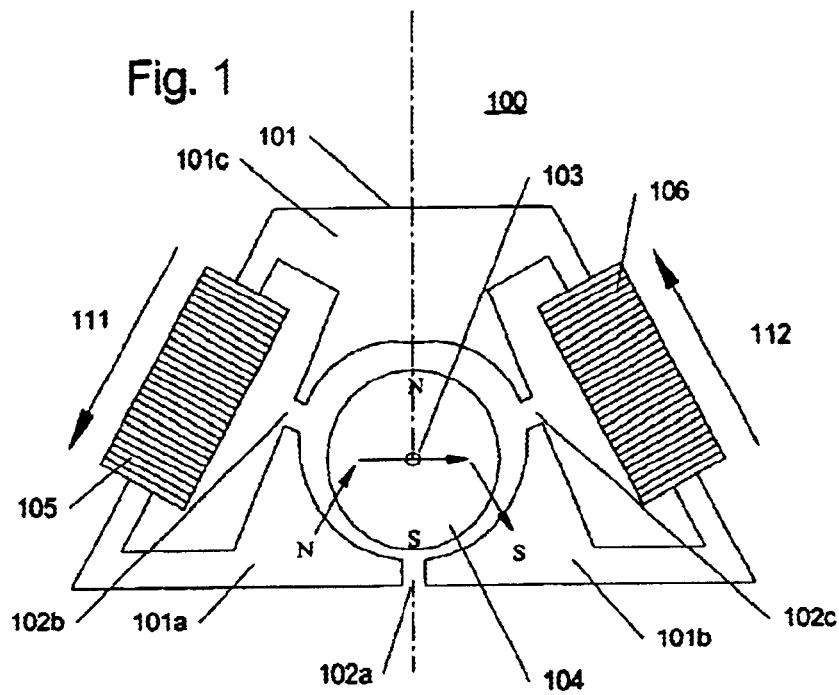
FIG. 1 illustrates a structural view of a conventional stepping motor.
Figure 2A:
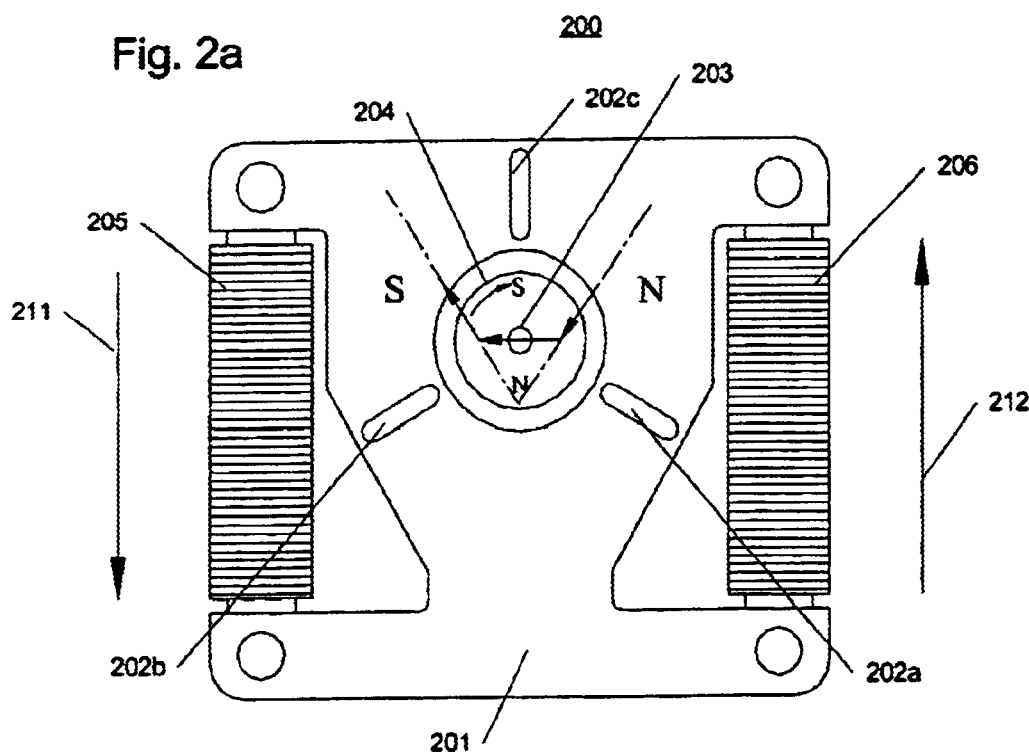

Referring now to FIG. 2a, an embodiment of the present stepping motor 200 is shown. Stepping motor 200 is comprised of a stator, a rotor and a control circuit (not shown). The stator is a stator blade 201 made of soft magnetic materials whose profile is quadrate and the center position of which is a rotor hole accommodating the rotor. The rotor is composed of permanent-magnet rotor 204 and rotor axis 203, and on both ends of the rotor axis 203 there are gears, which transfer rotation motion of the rotor 204. The sectional shape of the rotor hole is a concentric circle of that of the rotor. Coils 205 and 206 are provided respectively on both sides of the stator blade 201.

As illustrated, there are three narrow grooves 202a, 202b and 202c being spaced apart from each other by a angle of 120° along the radial direction of the rotor on the stator blade 201. Two ends of these narrow grooves are connected with the stator blade 201, and the distance from the end of each narrow groove to the center of the rotor axis 203 is the same. A magnetic-pole end surface surrounding the rotor hole is formed by the part between two narrow grooves.

When a current is applied to the coils 205 and 206 in a certain direction so as to make the direction 211 of the magnetic field produced by coil 205 downward and the direction 212 of the magnetic field produced by the coil 206 upward, a magnetic field is produced between the magnetic-pole end surfaces of the stator blade 201. The connections of the narrow grooves 202a, 202b and 202c with the stator blade 201 are very weak, thus the magnetic field is saturated at these weak connections. As shown in the diagram, the direction of the magnetic field at the connection of the narrow groove 202a is toward the lower left side of the page, and that of the magnetic field at the connection of the groove 202b is toward the upper left side of the page. Therefore, the direction of the composite moment that is produced is leftward, so as to push the rotor in a clockwise rotation.

Figure 2B:
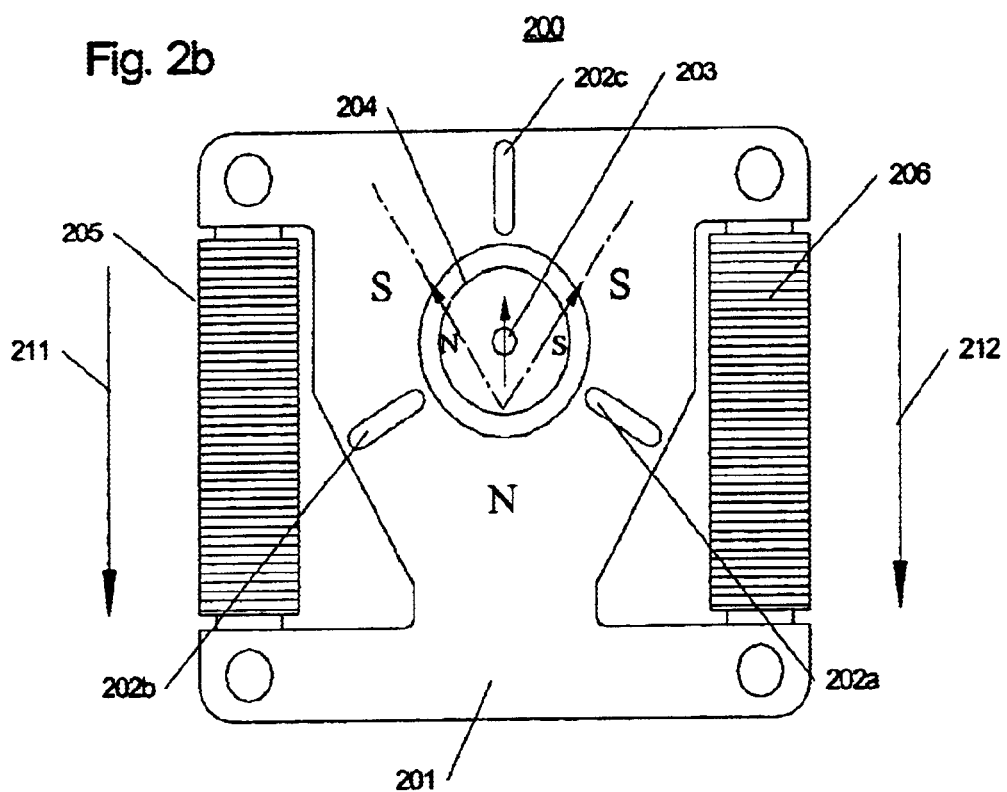

Referring now to FIG. 2b, when the current is applied to the coils 205 and 206 in a certain direction so as to make the direction 211 of the magnetic field produced by the coil 205 upward and the direction 212 of the magnetic field produced by the coil 206 downward. As a result, a magnetic field is produced between the magnetic-pole end surfaces of the stator blade 201. The direction of the magnetic field at the connection of the groove 202a is toward the upper right side of the page, and that of the magnetic field at the connection of the groove 202b is toward the upper left side of the page, therefore, the direction of the composite moment that is produced is upward, so as to continuously push the rotor 204 in a clockwise rotation.

Figure 2C:
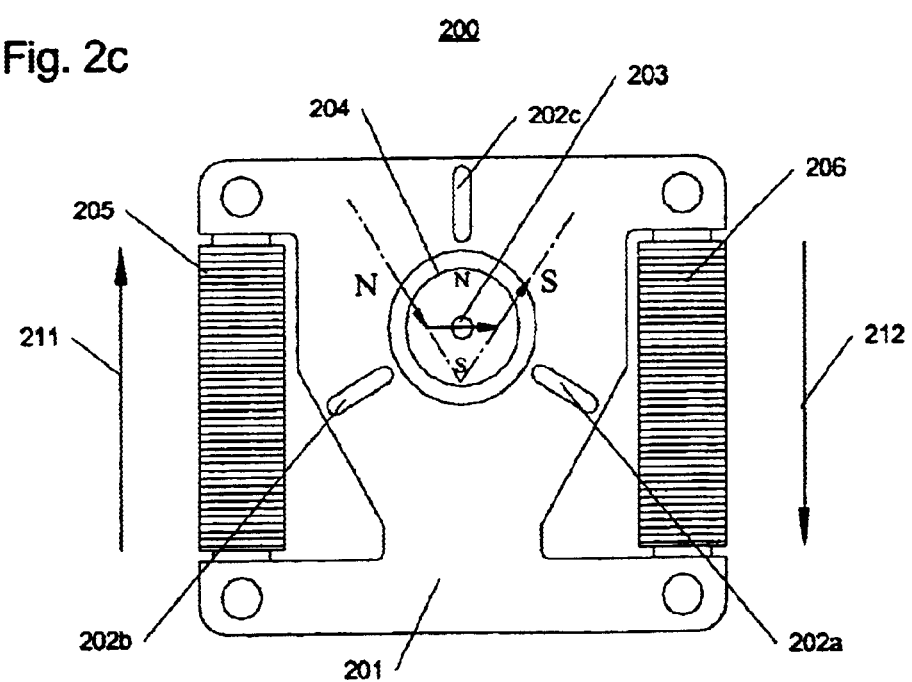

Referring now to FIG. 2c, when the current is applied to the coils 205 and 206 in a certain direction so as to make the direction 211 of the magnetic field produced by the coil 205 upward and the direction 212 of the magnetic field produced by the coil 206 downward, a resulting magnetic field is produced between the magnetic-pole end surfaces of the stator blade 201. The direction of the magnetic field at the connection of the groove 202a is toward the upper right side of the page, and that of the magnetic field at the connection of the groove 202b is toward the lower right side of the page, therefore, the direction of the composite moment that is produced is rightward, so as to continuously push the rotor in a clockwise rotation.

As shown in FIG. 2d, when the current is applied to the coils 205 and 206 in a certain direction so as to make both the direction 211 of the magnetic field produced by the coil 205 upward and the direction 212 of the magnetic field produced by the coil 206 upward, a magnetic field is produced between the magnetic-pole end surfaces of the stator blade 201. The direction of the magnetic field at the connection of the groove 202a is towards the lower left side of the page, and that of the magnetic field at the connection of the groove 202b is towards the lower right side of the page. Therefore, the direction of the composite moment that is produced is downward, so as to continuously push the rotor in a clockwise rotation.

Therefore, the current directions of two coils 205 and 206 may be changed, in order, under the control of the control circuit so as to make the motor 200 revolve in single direction. Because the distances from the points on the magnetic-pole end surfaces of the stator blade 201 to the axial center 203 of the rotor 204 are the same, and the rotor reaches balancing status at the end point of the narrow grooves, the motor can realize 120° stepped rotation.

Referring now to FIG. 3, a further embodiment of the present stepper motor 300 is shown. The difference between this example of the stepper motor and that described with reference to FIGS. 2a–2d, is that the vertical section of the rotor hole is not a concentric circle about the rotor. Instead, at the front-end positions of the narrow grooves 302a, 302b and 302c, straight-line sections 308a, 308b and 308c that are perpendicular to the diameter of the rotor are included. In this way, the locking moment of the magnetic field on the rotor can be increased at the end position of the narrow groove so as to make the rotor more firmly locked at the balancing point.

Thus, a stepper motor has been described. However, it should be remembered that the foregoing description made reference only to various embodiments of the present invention and that the full nature and scope of the present invention should only be measured by the claims, which now follow.

What is claimed is:

1. A stepping motor, comprising: a stator blade made of soft magnetic materials and incorporating three narrow grooves therein, each of the grooves having front ends; a permanent magnet rotor having a rotor axis and being accommodated within a rotor hole located at a center position of the stator blade, the rotor hole having a vertical cross section approximating a circle except for straight-line sections, each of which is disposed about the rotor hole in a location so as to be proximate and perpendicular to a respective one of the narrow grooves in the stator blade, which grooves are each disposed a angle of 120° to one another along a radial direction of the rotor; and coils disposed along two sides of the stator blade.

2. The stepping motor of claim 1, wherein a distance from each of the respective front ends of the narrow grooves to a center of the rotor axis is equal.

* * * * *

UNITED STATES PATENT AND TRADEMARK OFFICE
CERTIFICATE OF CORRECTION

PATENT NO. : 6,903,469 B2
DATED : June 7, 2005
INVENTOR(S) : Ng et al.

It is certified that error appears in the above-identified patent and that said Letters Patent is hereby corrected as shown below:

Title page,
Item [73], Assignee, delete "Communications" and replace with -- Communication --.

Signed and Sealed this

Twenty-seventh Day of September, 2005

JON W. DUDAS
*Director of the United States Patent and Trademark Office*